(12) United States Patent
Van Pelt

(10) Patent No.: US 7,954,868 B1
(45) Date of Patent: Jun. 7, 2011

(54) PORTABLE ANIMAL EXCREMENT COLLECTOR AND ASSOCIATED METHOD

(76) Inventor: James Van Pelt, Staten Island, NY (US)

( * ) Notice: Subject to any disclaimer, the term of this patent is extended or adjusted under 35 U.S.C. 154(b) by 388 days.

(21) Appl. No.: 12/157,149

(22) Filed: Jun. 6, 2008

(51) Int. Cl.
*A01K 29/00* (2006.01)

(52) U.S. Cl. .......................................... 294/1.5; 294/19.1

(58) Field of Classification Search .................. 294/1.4, 294/1.5, 19.1; 43/7, 11, 12
See application file for complete search history.

(56) References Cited

U.S. PATENT DOCUMENTS

| | | | | |
|---|---|---|---|---|
| 1,835,197 A | * | 12/1931 | Young | 43/12 |
| 5,320,313 A | * | 6/1994 | Crowe | 248/231.61 |
| 5,540,470 A | * | 7/1996 | Lu | 294/1.4 |
| 5,562,319 A | * | 10/1996 | Kohler | 294/1.4 |
| 5,671,959 A | * | 9/1997 | Tsou | 294/1.4 |
| 5,820,179 A | * | 10/1998 | Tsou | 294/1.4 |
| 6,796,075 B2 | * | 9/2004 | Maguire et al. | 43/12 |
| 6,796,587 B2 | * | 9/2004 | Tsou | 294/1.4 |

* cited by examiner

*Primary Examiner* — Saúl J Rodríguez
*Assistant Examiner* — Stephen Vu

(57) ABSTRACT

A portable animal excrement collecting apparatus for effectively discarding animal excrement in a sanitary manner includes an elongated shaft. A handle is fixedly attached to a proximal end of the shaft. The apparatus further includes a trigger and a trigger actuating mechanism that is operably coupled to the shaft and the handle respectively for resiliently biasing the trigger along an arcuate path defined proximate to the handle. A collection bag is positioned at a distal end of the shaft. The collection bag has an open top end for allowing a user to scoop up and collect the animal excrement. The apparatus also includes a mechanism for automatically detaching the collection bag from the distal end of the shaft by selectively adapting the trigger to a tensed position via the trigger actuating mechanism.

14 Claims, 8 Drawing Sheets

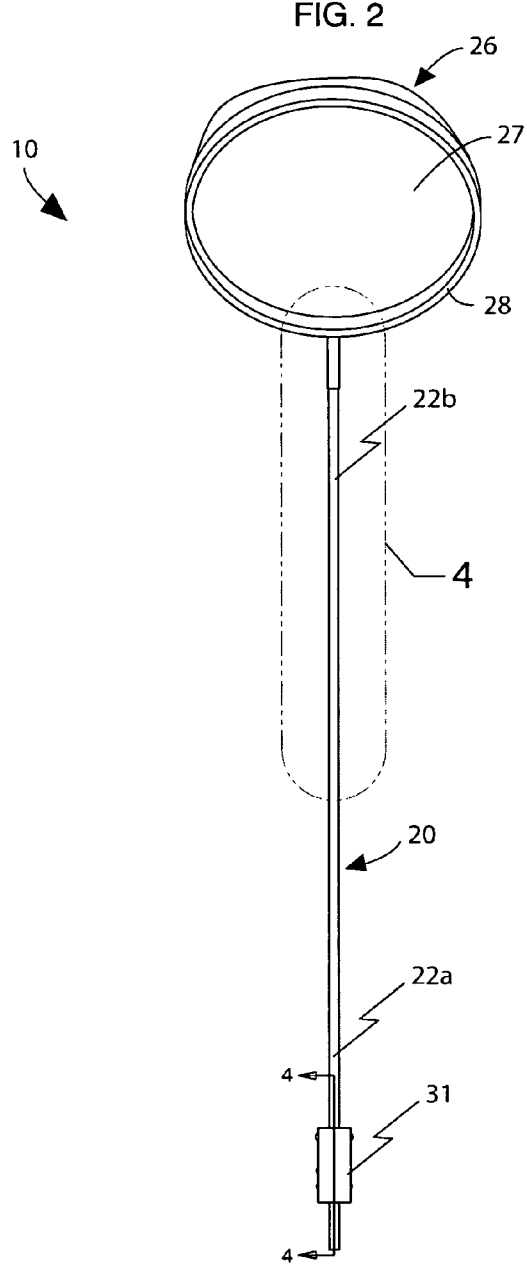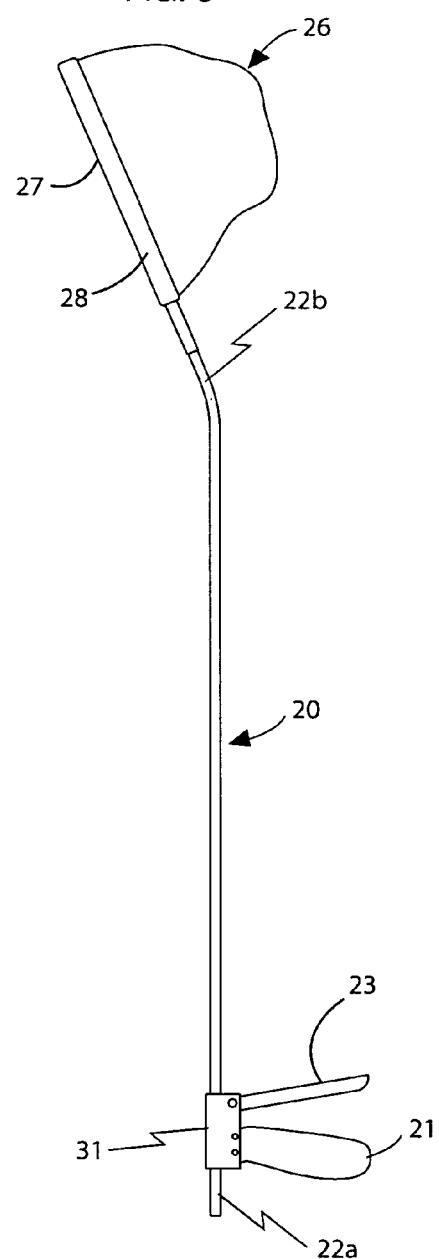

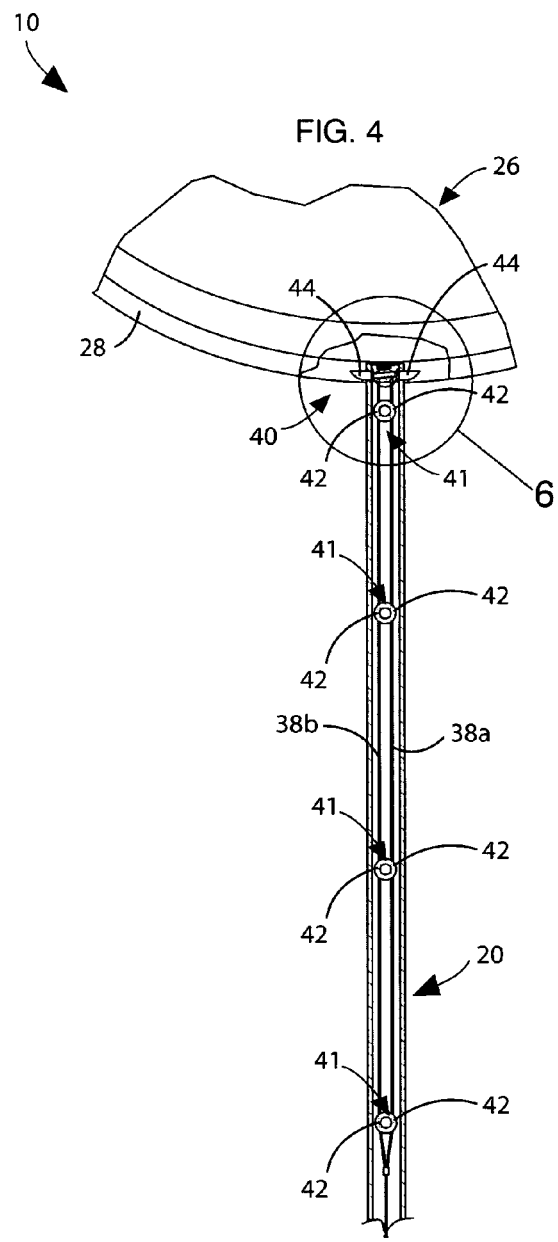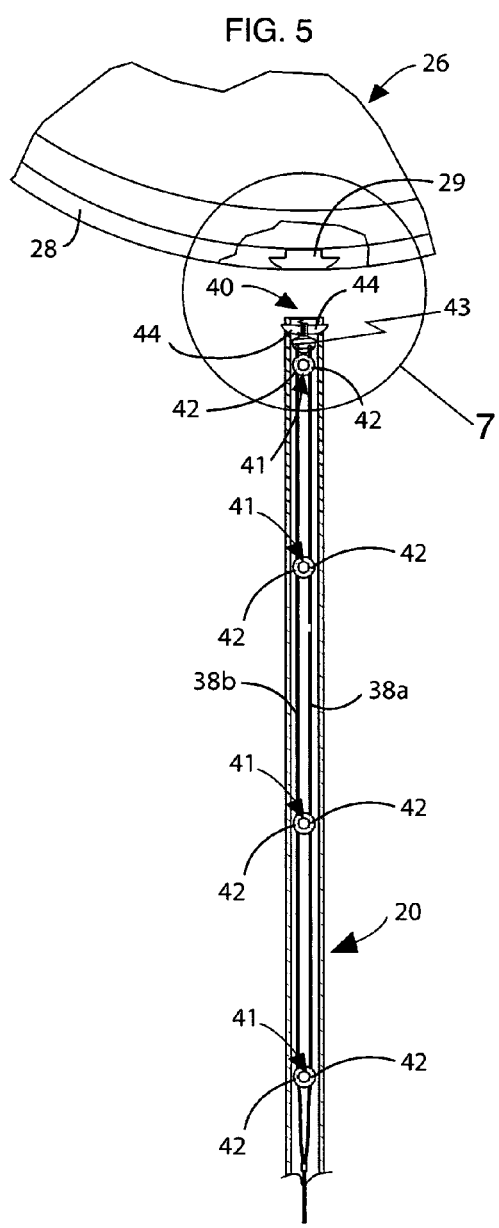

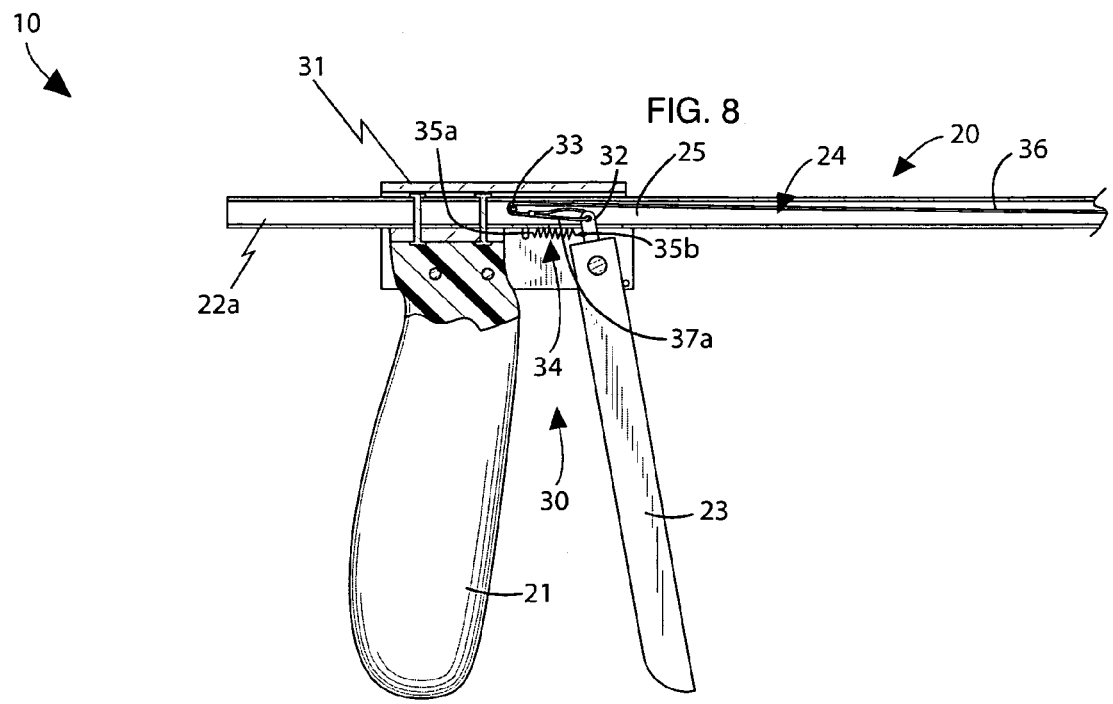
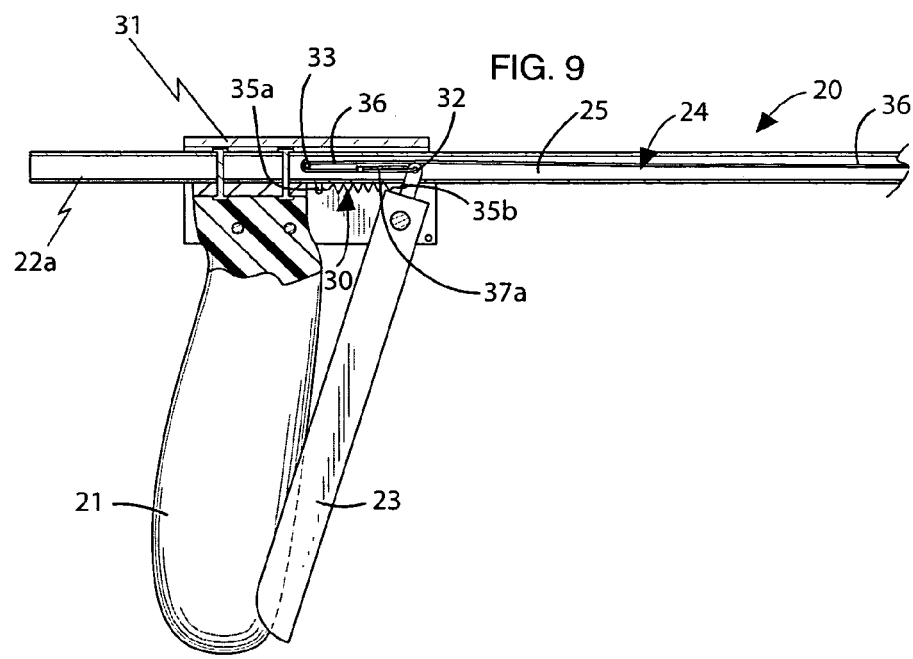

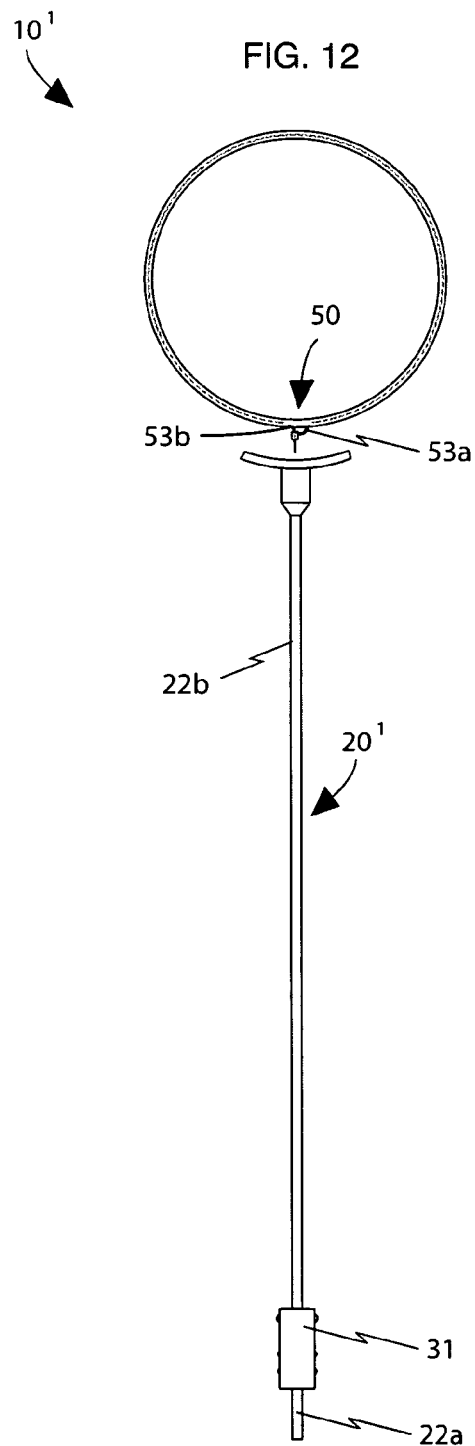
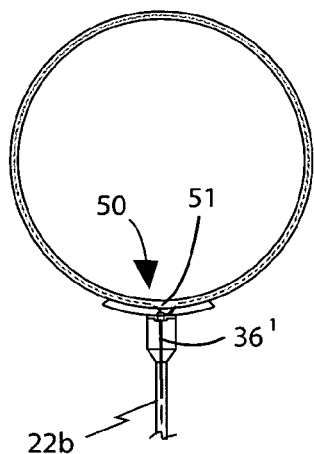
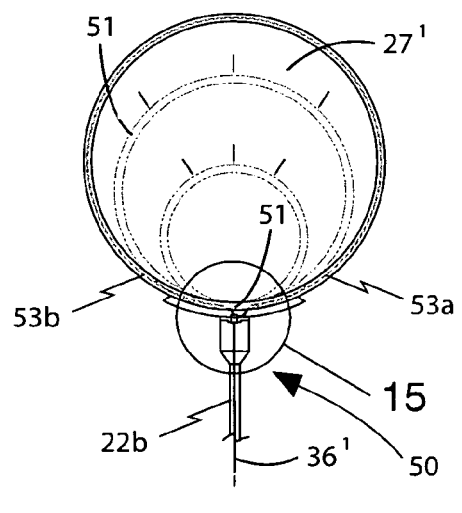

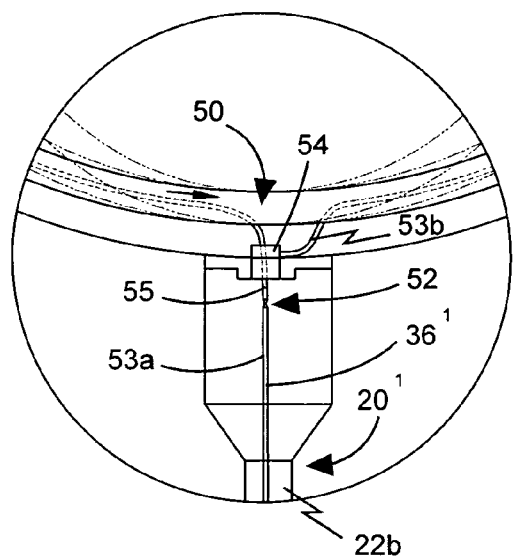
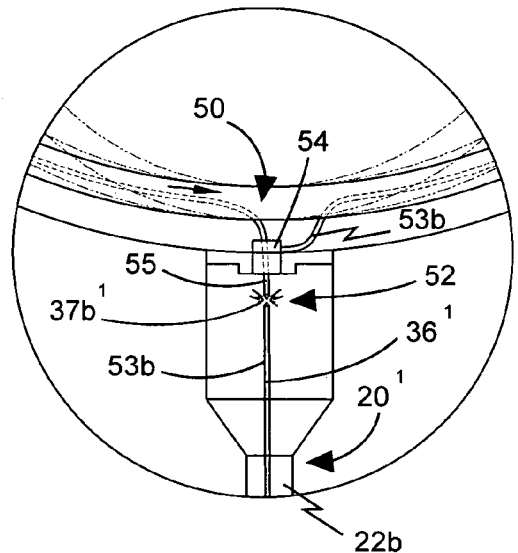
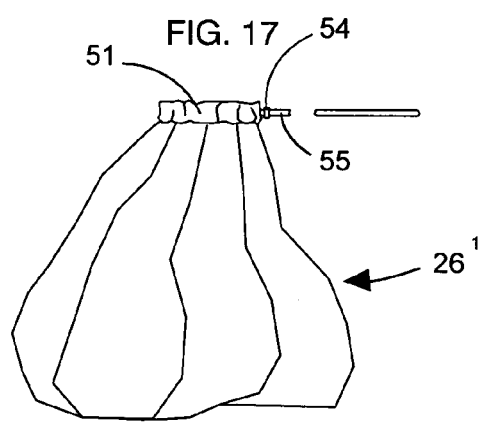

PORTABLE ANIMAL EXCREMENT COLLECTOR AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to excrement collectors and, more particularly, to a portable animal excrement collector and associated method for providing dog owners, dog walkers and care givers an easy and effective means of gathering and discarding dog waste.

2. Prior Art

With the quality of human life improving, more animals have been kept as pets around the world. Pets can make interesting, playful companions. People like them to be delightful and loyal and enjoy teaching them to do tricks and to obey commands. In addition to providing companionship, pets are a live teaching aid to children. However, it is quite an annoyance to collect pet's feces. People are often embarrassed to find their pets contaminating the environment with their excrement and do not know what to do. Many U.S. cities provide that the master will be fined $150 US, or more, if their pet empties its bowels on the road or in a public place.

Fastidious waste clean up is also essential to the good health of a pet and family. Disposal of pet stools regularly protect against disease-causing bacteria, hookworms, whipworms, and other organisms that could cause serious illness. In addition, your dog can spread or contract parvo-virus or corona-virus through infected feces. All of these diseases are very serious and common. Other important reasons to clean up pet waste include fly control, preventing stool eating, making a yard more useable, and responsible pet ownership.

Accordingly, a need remains for a portable animal excrement collector in order to overcome the above-noted shortcomings. The present invention satisfies such a need by providing an assembly that is convenient and easy to use, is durable yet lightweight in design, is versatile in its applications, and allows for easy clean up without direct contact of animal waste. Because the present invention is designed to catch waste, it effectively eliminates waste residues. The convenient design of the assembly handle also allows users to gather dog waste without having to bend over or stoop on their knees. Being environmentally friendly, the waste collector helps keep sidewalks, parks, and private yards clean.

BRIEF SUMMARY OF THE INVENTION

In view of the foregoing background, it is therefore an object of the present invention to provide an assembly for providing dog owners, dog walkers and care givers a most easy and effective means of catching and discarding dog waste. These and other objects, features, and advantages of the invention are provided by a portable animal excrement collector and associated method.

In a preferred embodiment of the present invention, a portable animal excrement collecting apparatus for effectively discarding animal excrement in a sanitary manner preferably includes an elongated shaft. A handle may fixedly be attached to a proximal end of the shaft. The assembly preferably further includes a trigger and a trigger actuating mechanism that is operably coupled to the shaft and the handle respectively for resiliently biasing the trigger along an arcuate path defined proximate to the handle. The trigger actuating mechanism preferably includes a housing that is statically coupled to the handle and the shaft. A lever may be attached to a top end of the trigger and penetrates into a cavity of the shaft respectively. An anchor pin is preferably mated to a bottom surface of the shaft and is disposed proximal to the lever while remaining seated within the housing.

The trigger actuating mechanism may also include a resilient spring member that has axially opposed ends directly connected to the anchor pin and the lever respectively. Such a spring member is configured in such a manner that the spring member expands along a horizontal travel path defined parallel to the shaft. A flexible cable preferably has a proximal end seated within the cavity of the shaft and affixed to the lever respectively. Such a cable further has a distal end affixed to the automatic collection bag detaching mechanism. The cable is effectively biased to the tensed position and proximally displaced along a linear travel path defined within the cavity of the shaft as the trigger is articulated along the arcuate path and engaged with the handle. Such a cable is effectively returned to equilibrium by releasing the trigger adapting the spring member to equilibrium respectively.

A collection bag may be positioned at a distal end of the shaft. Such a collection bag has an open top end for advantageously allowing a user to effectively scoop up and collect the animal excrement. The assembly preferably also includes a mechanism for automatically detaching the collection bag from the distal end of the shaft by selectively adapting the trigger to a tensed position via the trigger actuating mechanism.

The automatic collection bag detaching mechanism may include a plurality of guide members that are juxtaposed within the cavity of the shaft. The cable preferably includes first and second cable sections that extend along a major longitudinal length of the shaft. Each of the first and second cable sections abut against lateral edges of the guide members and thereby effectively remain spaced apart within the shaft and disposed substantially parallel to each other.

The automatic collection bag detaching mechanism preferably further includes a bracket that is statically connected to distal ends of the first and second cable sections respectively. A plurality of cam members may have curvilinear proximal edges coupled to the bracket. A first auxiliary spring member preferably has opposed ends directly anchored to the cam members. A second auxiliary spring member may have opposed ends directly anchored to the distal end of the shaft and a distal end of the bracket respectively.

The collection bag may be provided with a rigid rim formed about the open top end thereof. Such a rim preferably has a notch formed therein that is suitably sized and shaped for receiving the distal end of the shaft and the cam members in such a manner that the shaft is effectively prohibited from disengaging the rim while the cam members are laterally adapted to expanded positions and further while the first auxiliary spring member is at equilibrium respectively. A proximal displacement of the first and second cable sections is effectively caused by a combined force exerted by the second auxiliary spring member and the trigger actuating mechanism. The bracket is retracted along the shaft and thereby causes the cam members to become extracted from the notch and thereby effectively disengages the shaft from the rim respectively.

In an alternate embodiment of the present invention, the automatic collection bag detaching mechanism may include a mechanism for effectively adapting the open top end of the collection bag to a closed position prior to disengaging the collection bag from the shaft. Such a collection bag adapting mechanism is preferably operably engaged with the trigger actuating mechanism. The collection bag adapting mechanism may include a collapsible sleeve formed about a circumference of the open top end of the collection bag. The cable is preferably provided with a point of weakness positioned at a distal end thereof such that the cable is effectively segmented into first and second regions. A one-way fastener may be engaged with the second cable region and is configured in such a manner that a leading end of the second cable region extends proximally out from the one-way fastener. Such a second cable region is preferably interfitted through the sleeve and travels along the entire circumference of the open top end. The leading end of the second cable region may be mated with the cable at the weakness point.

The second cable region may selectively be retracted into the shaft as the trigger actuating mechanism proximally retracts the cable such that the sleeve is effectively and conveniently squeezed to a closed position and thereby advantageously adapts the open top end of the collection bag to the closed position. Such a second cable region is preferably caused to detach from the cable at the weakness point as a tension of the second cable region increases during closing of the open top end.

A method for collecting and effectively discarding animal excrement in a sanitary manner preferably includes the steps of providing an elongated shaft, providing and fixedly attaching a handle to a proximal end of the shaft, and providing a trigger. Further steps may include providing and operably coupling a trigger actuating mechanism to the shaft and the handle respectively for resiliently biasing the trigger along an arcuate path defined proximate to the handle, and providing and positioning a collection bag at a distal end of the shaft. Such a collection bag has an open top end for allowing a user to scoop up and collect the animal excrement. A final step may include automatically detaching the collection bag from the distal end of the shaft by selectively adapting the trigger to a tensed position via the trigger actuating mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a top plan view of the apparatus shown in FIG. 1;

FIG. 3 is a side-elevational view of the apparatus shown in FIG. 2;

FIG. 4 is an enlarged cross-sectional view of section 4 shown in FIG. 2 showing the shaft attached to the collection bag;

FIG. 5 is an enlarged cross-sectional view of section 4 shown in FIG. 2, showing the shaft detached from the collection bag;

FIG. 8 is a cross-sectional view of the trigger actuating mechanism at equilibrium, shown in FIG. 2, taken along line 8-8;

FIG. 9 is a cross-sectional view of the trigger actuating mechanism with the trigger at a compressed position;

FIG. 12 is a top plan view showing the alternate automatic collection bag detaching mechanism separated from the elongated shaft;

FIG. 13 is a top plan view of the assembly shown in FIG. 12, showing the collection bag attached to the elongated shaft;

FIG. 14 is a top plan view of the collection bag shown in FIG. 13, showing the open top end of the collection bag being adapted to a closed position;

FIG. 15 is an enlarged top plan view of section 15, shown in FIG. 14;

FIG. 16 is an enlarged top plan view of section 15 shown in FIG. 14, showing the second cable region under sufficient tension for detaching from the cable; and FIG. 17 is a side-elevational view of the assembly shown in FIG. 14, showing the collection bag adapted to a closed position.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements, and prime numbers refer to alternate embodiments of such elements, throughout the figures.

Figure 1:
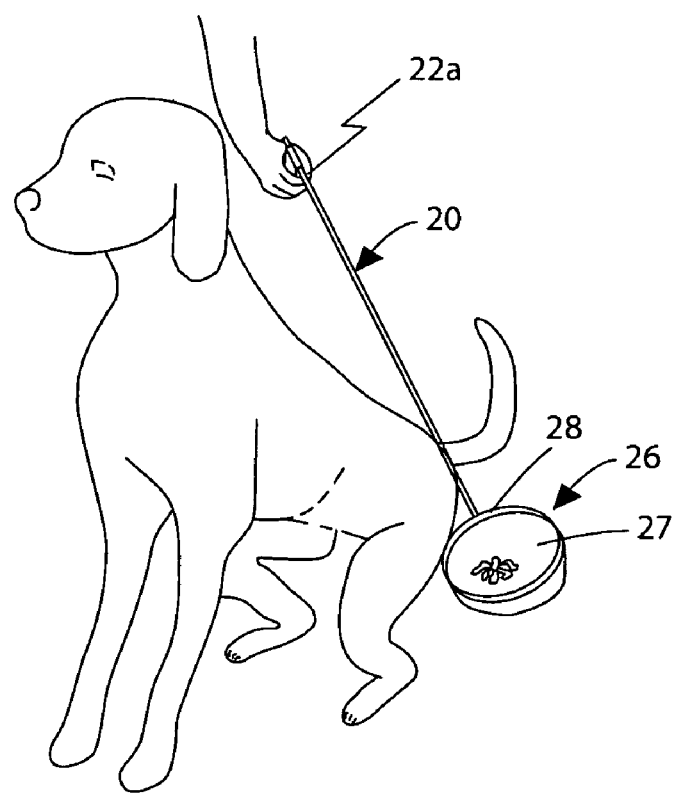
FIG. 1 is a perspective view showing a portable animal excrement collector, in accordance with the present invention.
Figure 6:
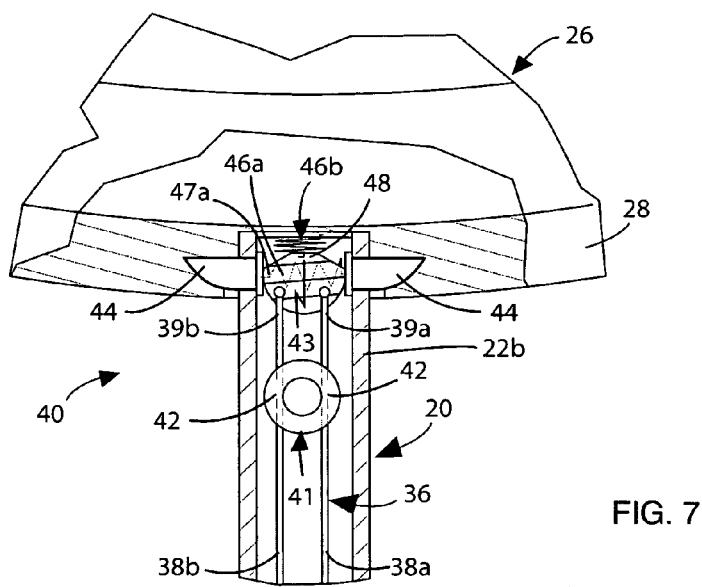
FIG. 6 is an enlarged partial view of section 6 shown in FIG. 4.
Figure 7:
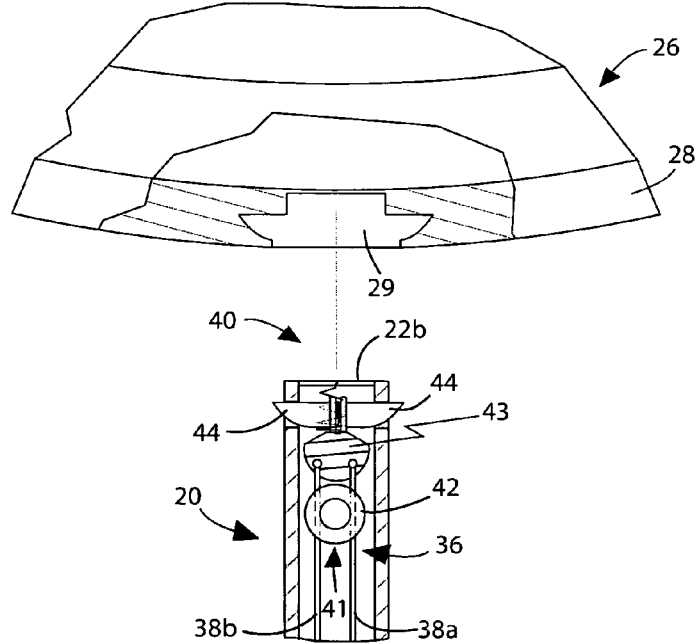
FIG. 7 is an enlarged partial view of section 7 shown in FIG. 5.
Figure 10:
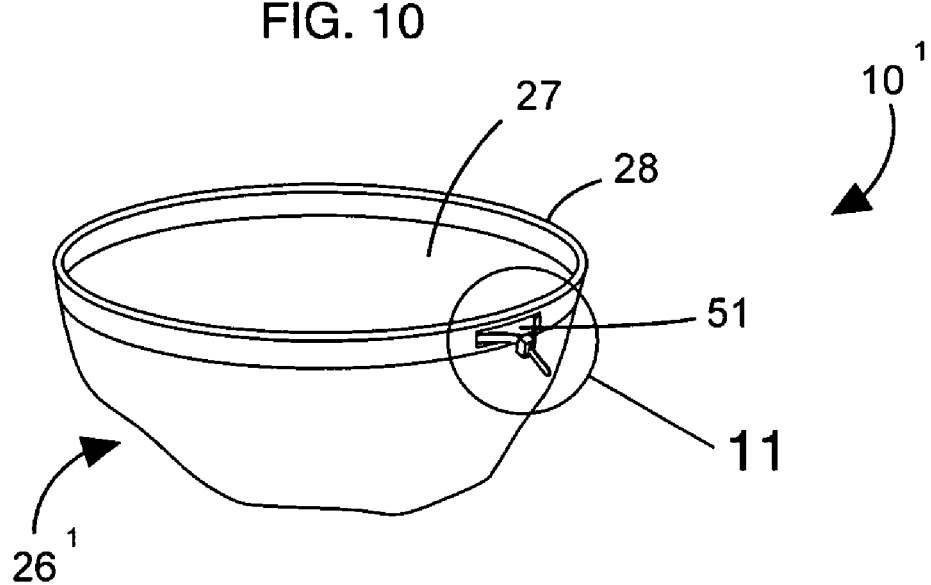
FIG. 10 is a perspective view showing an alternate embodiment of the automatic collection bag detaching mechanism, in accordance with the present invention.
Figure 11:
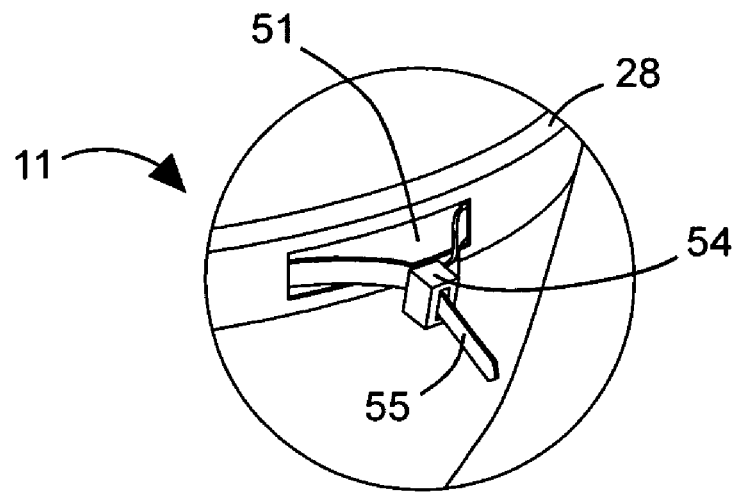
FIG. 11 is an enlarged perspective view of section 11, shown in FIG. 10.

The assembly of this invention is referred to generally in FIGS. 1-17 by the reference numeral 10 and is intended to provide a portable animal excrement collecting apparatus and associated method. It should be understood that the assembly 10 may be used for collecting many different types of hazardous materials in a remote and sanitary manner and should not be limited to only being used for collecting animal excrement.

Referring initially to FIGS. 1 through 9, a portable animal excrement collecting assembly 10 for effectively discarding animal excrement in a sanitary manner preferably includes an elongated shaft 20. A handle 21 may fixedly be attached to a proximal end 22A of the shaft 20. The assembly 10 preferably further includes a trigger 23 and a trigger actuating mechanism 30 that is operably coupled to the shaft 20 and the handle 21 respectively for resiliently biasing the trigger 23 along an arcuate path defined proximate to the handle 21. The trigger actuating mechanism 30 preferably includes a housing 31 that is statically coupled to the handle 21 and the shaft 20. A lever 32 may be attached to a top end of the trigger 23 and penetrates into a cavity 24 of the shaft 20 respectively. An anchor pin 33 is preferably mated to a bottom surface 25 of the shaft 20 and is disposed proximal to the lever 32 while remaining seated within the housing 31.

Referring to FIGS. 8 and 9, the trigger actuating mechanism 30 may also include a resilient spring member 34 that has axially opposed ends 35A, 35B directly connected, without the use of intervening elements, to the anchor pin 33 and the lever 32 respectively. Such a spring member 34 is configured in such a manner that the spring member 34 effectively expands along a horizontal travel path defined parallel to the shaft 20. A flexible cable 36 preferably has a proximal end 37A seated within the cavity 24 of the shaft 20 and affixed to the lever 32 respectively. Such a cable 36 further has a distal end 37B affixed to the automatic collection bag detaching mechanism 40 (described herein below). The cable 36 is effectively biased to the tensed position and proximally displaced along a linear travel path defined within the cavity 24 of the shaft 20 as the trigger 23 is articulated along the arcuate path and engaged with the handle 21. Such a cable 36 is effectively returned to equilibrium by releasing the trigger 23 adapting the spring member 34 to equilibrium respectively.

Referring to FIGS. 1 through 7, a collection bag 26 may be positioned at a distal end 22B of the shaft 20. Such a collection bag 26 has an open top end 27, which is essential and advantageous for allowing a user to effectively scoop up and collect the animal excrement without having to make direct contact with the animal excrement. The combination of such claimed elements is not rendered obvious by one skilled in the art because it also provides an unpredictable and unexpected benefit by which the length of the shaft 20 and the collection bag 26 at the distal end 22B thereof advantageously eliminates the need for persons to bend over in order to collect animal excrement. The assembly 10 preferably also includes a mechanism 40 for automatically detaching the collection bag 26 from the distal end 22B of the shaft 20 by selectively adapting the trigger 23 to a tensed position via the trigger actuating mechanism 30.

Referring to FIGS. 4 through 7, the automatic collection bag detaching mechanism 40 may include a plurality of guide members 41 that are juxtaposed within the cavity 24 of the shaft 20. The cable 36 preferably includes first 38A and second 38B cable sections 38 that extend along a major longitudinal length of the shaft 20. Each of the first 38A and second 38B cable sections abut against lateral edges 42 of the guide members 41, which is important for effectively allowing the cable sections 38 to remain spaced apart within the shaft 20 and disposed substantially parallel to each other, such that a travel path of each cable section 38A, 38B is not impeded by the other during operating conditions. The abutting relationship of the first 38A and second 38B cable sections with the lateral edges 42 of the guide members 41 provides the unexpected and unpredictable benefit of preventing the cable sections 38 from binding up on each such that the trigger actuating mechanism 30 is always operated in a smooth and consistent manner.

Again referring to FIGS. 4 through 7, the automatic collection bag detaching mechanism 40 preferably further includes a bracket 43 that is statically connected to distal ends 39A, 39B of the first 38A and second 38B cable sections respectively. A plurality of cam members 44 may have curvilinear proximal edges coupled to the bracket 43. A first auxiliary spring member 46A preferably has opposed ends 47A directly anchored, without the use of intervening elements, to the cam members 44. A second auxiliary spring member 46B may have opposed ends 47B directly anchored, without the use of intervening elements, to the distal end 22B of the shaft 20 and a distal end 48 of the bracket 43 respectively.

Referring to FIGS. 1 through 7, the collection bag 26 may be provided with a rigid rim 28 formed about the open top end 27 thereof. Such a rim 28 preferably has a notch 29 formed therein that is suitably sized and shaped for receiving the distal end 22B of the shaft 20 and the cam members 44 in such a manner that the shaft 20 is effectively and advantageously prohibited from disengaging the rim 28 while the cam members 44 are laterally adapted to expanded positions and further while the first auxiliary spring member 46A is at equilibrium respectively. A proximal displacement of the first 38A and second 38B cable sections is effectively caused by a combined force exerted by the second auxiliary spring member 46B and the trigger actuating mechanism 30.

The bracket 43 is retracted along the shaft 20 and thereby effectively causes the cam members 44 to become extracted from the notch 29 and thereby conveniently disengages the shaft 20 from the rim 28 respectively. The relationship of the cam members 44 and the notch 29 is not rendered obvious by one skilled in the art because it provides an unpredictable and unexpected result that resolves the shortcoming of having to manually touch the collection bag 26 during removal from the assembly 10 once it has been filled with animal excrement or the like.

Referring to FIGS. 10 through 17, in an alternate embodiment 10' of the present invention, the automatic collection bag detaching mechanism 40' may include a mechanism 50 for effectively adapting the open top end 27' of the collection bag 26' to a closed position prior to disengaging the collection bag 26' from the shaft 20'. Such a collection bag adapting mechanism 50 is preferably operably engaged with the trigger actuating mechanism. The collection bag adapting mechanism 50 may include a collapsible sleeve 51 formed about a circumference of the open top end 27' of the collection bag 26'. The cable 36' is preferably provided with a point of weakness 52 positioned at a distal end 37B' thereof such that the cable 36' is effectively segmented into first 53A and second 53B regions. A one-way fastener 54 may be engaged with the second cable region 53B and is configured in such a manner that a leading end 55 of the second cable region 53B extends proximally out from the one-way fastener 54. Such a second cable region 53B is preferably interfitted through the sleeve 51 and travels along the entire circumference of the open top end 27'. The leading end 55 of the second cable region 53B may be mated with the cable 36' at the weakness point 52.

Again referring to FIGS. 10 through 17, the second cable region 53B may selectively be retracted into the shaft 20' as the trigger actuating mechanism 30' proximally retracts the cable 36' such that the sleeve 51 is effectively and conveniently squeezed to a closed position and thereby advantageously adapts the open top end 27' of the collection bag 26' to the closed position. Such a second cable region 53B is preferably caused to detach from the cable 36' at the weakness point 52 as a tension of the second cable region 53B increases during closing of the open top end 27'. The relationship of the collection bag adapting mechanism 50, the weakness point 52, the segmented cable 36' and the trigger actuating mechanism is not rendered obvious by one skilled in the art because it provides an unpredictable and unexpected result that resolves the shortcoming of having to manually touch the collection bag 26' during both removal from the assembly 10 once it has been filled with animal excrement or the like and when closing the collection bag 26' prior to discarding the same.

Referring to the figures in general, the assembly 10 includes a lightweight, yet durable elongated shaft 20 that is produced of metal material. Such a shaft 20 has an ample total length for allowing users to operate the assembly while standing upright. Of course, the shaft 20 may be produced in a variety of lengths and from alternate suitable materials, as is obvious to a person of ordinary skill in the art. The shaft 20 preferably includes a hollow cavity 24 and a durable metal cable 36 that travels through the cavity 24. A handle 21 is positioned at the proximal end 22A of the shaft 20 and is directly connected, without the use of intervening elements, to a collection bag 26 located on the distal end 22B of the shaft 20 via the cable 36. Such a handle 21 is perpendicularly attached to the shaft 20 and has a grooved, rubberized coating that is crucial for facilitating a firm and comfortable grip. The handle 21 further includes a trigger actuating mechanism 30 for use in effectively controlling the action of the collection bag 26. The collection bag 26 is directly attached, without the use of intervening elements, to the distal end 22B of the shaft 22. This is done simply by sliding the collection bag 26 into the distal end 22B of the shaft 20.

In use, the assembly 10 is simple and straightforward to operate. The user first attaches a suitably sized and shaped, collection bag 26 at the distal end 22B of the shaft 20. While carrying the assembly 10 by the handle 21, the user walks their dog as usual. When it appears the dog is ready to eliminate waste, the user simply positions the collection bag 26 underneath the dog. When the dog is finished, the user quickly and easily squeezes the trigger 23, drawing the attached bag 26 closed and advantageously sealing the waste therein. At a trash receptacle, the user squeezes the trigger 23 again until the attached bag 26 breaks off at a set breaking point 52, thus conveniently allowing the bag 26 to drop into the receptacle. At no point does the user have to touch the filled bag 26.

The present invention, as claimed, provides the unexpected and unpredictable benefit of an assembly 10 that is convenient and easy to use, is durable yet lightweight in design, is versatile in its applications, and allows for easy clean up without direct contact of animal waste. Because the present invention is designed to catch waste, it effectively eliminates waste residues. The convenient design of the assembly handle 21 also allows users to gather dog waste without having to bend over or stoop on their knees. Being environmentally friendly, the waste collector helps keep sidewalks, parks, and private yards clean.

In use, a method for collecting and effectively discarding animal excrement in a sanitary manner preferably includes the steps of providing an elongated shaft 20, 20', providing and fixedly attaching a handle 21 to a proximal end 22A of the shaft 20, 20', and providing a trigger 23. Further steps may include providing and operably coupling a trigger actuating mechanism 30, 30' to the shaft 20, 20' and the handle 21 respectively for resiliently biasing the trigger 23 along an arcuate path defined proximate to the handle 21, and providing and positioning a collection bag 26, 26' at a distal end 22B of the shaft 20, 20'. Such a collection bag 26, 26' has an open top end 27, 27' for allowing a user to scoop up and collect the animal excrement. A final step may include automatically detaching the collection bag 26, 26' from the distal end 22B of the shaft 20, 20' by selectively adapting the trigger 23 to a tensed position via the trigger actuating mechanism 30, 30'.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable animal excrement collecting apparatus for effectively discarding animal excrement in a sanitary manner, said portable animal excrement collecting apparatus comprising:
   a shaft;
   a handle attached to a proximal end of said shaft;
   a trigger;
   a trigger actuating mechanism coupled to said shaft and said handle respectively for biasing said trigger;
   a collection bag positioned at a distal end of said shaft, said collection bag having an open top end for allowing a user to scoop up and collect the animal excrement; and
   means for automatically detaching said collection bag from said distal end of said shaft by selectively adapting said trigger to a tensed position via said trigger actuating mechanism;
   wherein said trigger actuating mechanism comprising:
   a housing statically coupled to said handle and said shaft;
   a lever attached to a top end of said trigger and penetrating into a cavity of said shaft respectively;
   an anchor pin mated to a bottom surface of said shaft and being disposed proximal to said lever while remaining seated within said housing;
   a resilient spring member having axially opposed ends directly connected to said anchor pin and said lever respectively, said spring member being configured in such a manner that said spring member expands along a horizontal travel path defined parallel to said shaft; and
   a flexible cable having a proximal end seated within said cavity of said shaft and affixed to said lever respectively, said cable further having a distal end affixed to said automatic collection bag detaching means;
   wherein said cable is biased to the tensed position and proximally displaced along a linear travel path defined within said cavity of said shaft as said trigger is articulated along said arcuate path and engaged with said handle, said cable being returned to equilibrium by releasing said trigger adapting said spring member to equilibrium respectively.

2. The portable animal excrement collecting apparatus of claim 1, wherein said automatic collection bag detaching means comprises:
   a plurality of guide members juxtaposed within said cavity of said shaft;

wherein said cable includes first and second cable sections extending along a major longitudinal length of said shaft, each of said first and second cable sections abutting against lateral edges of said guide members and thereby remaining spaced apart within said shaft and disposed substantially parallel to each other;
a bracket statically connected to distal ends of said first and second cable sections respectively;
a plurality of cam members having curvilinear proximal edges coupled to said bracket;
a first auxiliary spring member having opposed ends directly anchored to said cam members; and
a second auxiliary spring member having opposed ends directly anchored to said distal end of said shaft and a distal end of said bracket respectively.

3. The portable animal excrement collecting apparatus of claim 2, wherein said collection bag is provided with a rigid rim formed about said open top end thereof, said rim having a notch formed therein that is suitably sized and shaped for receiving said distal end of said shaft and said cam members in such a manner that said shaft is prohibited from disengaging said rim while said cam members are laterally adapted to expanded positions and further while said first auxiliary spring member is at equilibrium respectively;
wherein a proximal displacement of said first and second cable sections is caused by a combined force exerted by said second auxiliary spring member and said trigger actuating mechanism;
wherein said bracket is retracted along said shaft and thereby causes said cam members to become extracted from said notch and thereby disengage said shaft from said rim respectively.

4. The portable animal excrement collecting apparatus of claim 1, wherein said automatic collection bag detaching means comprises:
means for adapting said open top end of said collection bag to a closed position prior to disengaging said collection bag from said shaft, said collection bag adapting means being operably engaged with said trigger actuating mechanism.

5. The portable animal excrement collecting apparatus of claim 4, wherein said collection bag adapting means comprises
a collapsible sleeve formed about a circumference of said open top end of said collection bag, said cable being provided with a point of weakness positioned at a distal end thereof such that said cable is segmented into first and second regions, and
a one-way fastener engaged with said second cable region and being configured in such a manner that a leading end of said second cable region extends proximally out from said one-way fastener, said second cable region being interfitted through said sleeve and traveling along the entire circumference of said open top end;
wherein said leading end of said second cable region is mated with said cable at said weakness point.

6. The portable animal excrement collecting apparatus of claim 5, wherein said second cable region is selectively retracted into said shaft as said trigger actuating mechanism proximally retracts said cable such that said sleeve is squeezed to a closed position and thereby adapts said open top end of said collection bag to the closed position.

7. The portable animal excrement collecting apparatus of claim 5, wherein said second cable region is caused to detach from said cable at said weakness point as a tension of said second cable region increases during closing of said open top end.

8. A portable animal excrement collecting apparatus for effectively discarding animal excrement in a sanitary manner, said portable animal excrement collecting apparatus comprising:
an elongated shaft;
a handle fixedly attached to a proximal end of said shaft;
a trigger;
a trigger actuating mechanism operably coupled to said shaft and said handle respectively for resiliently biasing said trigger along an arcuate path defined proximate to said handle;
a collection bag positioned at a distal end of said shaft, said collection bag having an open top end for allowing a user to scoop up and collect the animal excrement; and
means for automatically detaching said collection bag from said distal end of said shaft by selectively adapting said trigger to a tensed position via said trigger actuating mechanism;
wherein said trigger actuating mechanism comprising:
a housing statically coupled to said handle and said shaft;
a lever attached to a top end of said trigger and penetrating into a cavity of said shaft respectively;
an anchor pin mated to a bottom surface of said shaft and being disposed proximal to said lever while remaining seated within said housing;
a resilient spring member having axially opposed ends directly connected to said anchor pin and said lever respectively, said spring member being configured in such a manner that said spring member expands along a horizontal travel path defined parallel to said shaft; and
a flexible cable having a proximal end seated within said cavity of said shaft and affixed to said lever respectively, said cable further having a distal end affixed to said automatic collection bag detaching means;
wherein said cable is biased to the tensed position and proximally displaced along a linear travel path defined within said cavity of said shaft as said trigger is articulated along said arcuate path and engaged with said handle, said cable being returned to equilibrium by releasing said trigger adapting said spring member to equilibrium respectively.

9. The portable animal excrement collecting apparatus of claim 8, wherein said automatic collection bag detaching means comprises:
a plurality of guide members juxtaposed within said cavity of said shaft;
wherein said cable includes first and second cable sections extending along a major longitudinal length of said shaft, each of said first and second cable sections abutting against lateral edges of said guide members and thereby remaining spaced apart within said shaft and disposed substantially parallel to each other;
a bracket statically connected to distal ends of said first and second cable sections respectively;
a plurality of cam members having curvilinear proximal edges coupled to said bracket;
a first auxiliary spring member having opposed ends directly anchored to said cam members; and
a second auxiliary spring member having opposed ends directly anchored to said distal end of said shaft and a distal end of said bracket respectively.

10. The portable animal excrement collecting apparatus of claim 9, wherein said collection bag is provided with a rigid rim formed about said open top end thereof, said rim having a notch formed therein that is suitably sized and shaped for receiving said distal end of said shaft and said cam members in such a manner that said shaft is prohibited from disengaging said rim while said cam members are laterally adapted to expanded positions and further while said first auxiliary spring member is at equilibrium respectively;

wherein a proximal displacement of said first and second cable sections is caused by a combined force exerted by said second auxiliary spring member and said trigger actuating mechanism;

wherein said bracket is retracted along said shaft and thereby causes said cam members to become extracted from said notch and thereby disengage said shaft from said rim respectively.

11. The portable animal excrement collecting apparatus of claim 9, wherein said automatic collection bag detaching means comprises:

means for adapting said open top end of said collection bag to a closed position prior to disengaging said collection bag from said shaft, said collection bag adapting means being operably engaged with said trigger actuating mechanism.

12. The portable animal excrement collecting apparatus of claim 11, wherein said collection bag adapting means comprises a collapsible sleeve formed about a circumference of said open top end of said collection bag, said cable being provided with a point of weakness positioned at a distal end thereof such that said cable is segmented into first and second regions, and a one-way fastener engaged with said second cable region and being configured in such a manner that a leading end of said second cable region extends proximally out from said one-way fastener, said second cable region being interfitted through said sleeve and traveling along the entire circumference of said open top end;

wherein said leading end of said second cable region is mated with said cable at said weakness point.

13. The portable animal excrement collecting apparatus of claim 12, wherein said second cable region is selectively retracted into said shaft as said trigger actuating mechanism proximally retracts said cable such that said sleeve is squeezed to a closed position and thereby adapts said open top end of said collection bag to the closed position.

14. The portable animal excrement collecting apparatus of claim 13, wherein said second cable region is caused to detach from said cable at said weakness point as a tension of said second cable region increases during closing of said open top end.

\* \* \* \* \*